(12) United States Patent
Lerche et al.

(10) Patent No.: US 7,336,474 B2
(45) Date of Patent: Feb. 26, 2008

(54) MICROELECTROMECHANICAL DEVICES

(75) Inventors: Nolan C. Lerche, Stafford, TX (US); James E. Brooks, Manvel, TX (US); Anthony F. Veneruso, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 725 days.

(21) Appl. No.: 10/708,182

(22) Filed: Feb. 13, 2004

(65) Prior Publication Data

US 2004/0160726 A1    Aug. 19, 2004

Related U.S. Application Data

(63) Continuation-in-part of application No. 09/946,249, filed on Sep. 5, 2001, now Pat. No. 7,116,542, which is a continuation-in-part of application No. 09/404,092, filed on Sep. 23, 1999, now Pat. No. 6,385,031.

(60) Provisional application No. 60/230,077, filed on Sep. 5, 2000.

(51) Int. Cl.
*H02H 9/00* (2006.01)
(52) U.S. Cl. ........................ 361/248; 361/120
(58) Field of Classification Search ............... 361/248, 361/120
See application file for complete search history.

(56) References Cited

U.S. PATENT DOCUMENTS

| | | | |
|---|---|---|---|
| 3,181,463 A | 5/1965 | Morgan et al. | |
| 3,691,631 A | 9/1972 | Bhola | |
| 5,088,413 A | 2/1992 | Huber et al. | |
| 5,094,167 A | 3/1992 | Hendley, Jr. | |
| 5,249,095 A | 9/1993 | Hunter | |
| 5,331,249 A | 7/1994 | Minamikata et al. | 313/632 |
| 5,347,929 A | 9/1994 | Lerche et al. | |
| 5,355,959 A | 10/1994 | Walter et al. | |
| 5,444,598 A | 8/1995 | Aresco | |
| 5,505,134 A | 4/1996 | Brooks et al. | |
| 5,638,946 A | 6/1997 | Zavracky | |

(Continued)

FOREIGN PATENT DOCUMENTS

DE    3924745 A1    11/1993

(Continued)

OTHER PUBLICATIONS

Brooks, James E.; A Simple Method for Estimating Well Productivity; Society of Petroleum Engineers; SPE 38148; Jun. 1997; pp. 57-64.
Collins, Philip G. & Zettla, A.; A Simple and Robust Electron Beam Source From Carbon Nanotubes; American Institute of Physics; Sep. 23, 1996; pp. 1969-1971.

(Continued)

*Primary Examiner*—Stephen W. Jackson
(74) *Attorney, Agent, or Firm*—Bryan P. Galloway; Kevin B. McGoff; Trop, Pruner & Hu, P.C.

(57) ABSTRACT

An apparatus includes a switch comprising microelectromechanical elements, the microelectromechanical elements including a sealed chamber containing a dielectric element, and conductors in the sealed chamber. The conductors are arranged such that application of greater than a predetermined voltage to at least one of the conductors causes ionization breakdown of the dielectric element to provide an electrically conductive path between the conductors. In another implementation, a switch includes a nanotube electron emitter or a radioactive isotope electron emitter.

39 Claims, 8 Drawing Sheets

U.S. PATENT DOCUMENTS

| | | | |
|---|---|---|---|
| 5,769,160 A | 6/1998 | Owens | |
| 5,833,490 A | 11/1998 | Bouldin | |
| 5,909,078 A | 6/1999 | Wood et al. | |
| 6,097,138 A | 8/2000 | Nakamoto | 313/309 |
| 6,100,477 A | 8/2000 | Randall et al. | |
| 6,333,016 B1 | 12/2001 | Resasco et al. | |
| 6,385,031 B1 | 5/2002 | Lerche et al. | |
| 6,386,108 B1 | 5/2002 | Brooks et al. | |
| 6,440,761 B1 | 8/2002 | Choi | |
| 2002/0048135 A1 | 4/2002 | Lerche | |
| 2003/0200890 A1 | 10/2003 | Reynolds et al. | |

FOREIGN PATENT DOCUMENTS

| | | |
|---|---|---|
| EP | 0555651 A1 | 5/1988 |
| EP | 0913508 A3 | 12/1999 |
| FR | 845240 | 8/1960 |
| GB | 2367574 A | 4/2002 |
| JP | 2168588 | 6/1990 |
| WO | WO 00/20820 A2 | 4/2000 |
| WO | WO 01/46638 A1 | 6/2001 |
| WO | WO 02/01584 A1 | 1/2002 |
| WO | WO 02/20820 A1 | 3/2002 |

OTHER PUBLICATIONS

Dean et al.; Carbon Nanotube Field Emission Electron Source; New Diamond and Frontier Carbon Technology; 2002; vol. 12, No. 4.

Fisher, Timothy S.; Nanoscale Energy Conversion by Selective Electron Emission: A New Paradigm or Maxwell's Demon Revisited?; Energy and Nanotechnology: Strategy for the Future Baker Institute, Rice University, May 4, 2003.

Modi, Ashish; Koratkar, Nikhil; Lass, Eric; Wei, Bingqing; & Ajayan, Pulickel M.; Miniaturized Gas Ionization Sensors Using Carbon Nanotubes; Nature; Jul. 2003; pp. 171-174; vol. 424.

Wei, B.Q. Vajtai, R.; Jung, Y.; Ward, J.; Zhang, R.; Ramanath, G.; Ajayan, P.M.; Organized Assembly of Carbon Nanotubes, Cunning Refinements Help to Customize the Architecture of Nanotube Structures; Brief Communications in NATURE; Apr. 2002; pp. 495-496; vol. 416.

Wei, B.Q, Vajtai, R.; Jung, Y.; Ward, J.; Zhang, R.; Ramanath, G.; Ajayan, P.M.; Assembly of Highly Organized Carbon Nanotube Architectures by Chemical Vapor Deposition; Chem. Mater. 2003, pp. 1598-1606.

Industry News: Using Molecular Switches, HP Claims Nano-Technology Advance with 64-bit Memory IC; Micro Magazine.com; Feb. 13, 2004.

MICROELECTROMECHANICAL DEVICES

CROSS REFERENCE TO RELATED APPLICATIONS

This is a continuation-in-part of U.S. Ser. No. 09/946,249, filed Sep. 5, 2001 now U.S. Pat. No. 7,116,542, which is a continuation-in-part of U.S. Ser. No. 09/404,092, entitled "Switches for Use in Tools," filed Sep. 23, 1999 now U.S. Pat. No. 6,385,031; U.S. Ser. No. 09/946,249 also claims the benefit under 35 U.S.C. §119(e) of U.S. Provisional Patent Application Ser. No. 60/230,077, entitled, "MICRO-SWITCHES FOR DOWN-HOLE USE," filed on Sep. 5, 2000.

BACKGROUND OF INVENTION

The invention relates to microelectromechanical devices.

In forming a well, many different types of operations may be performed, including drilling, logging, completion, and production operations. Various different types of devices are used to perform the desired operations. Examples of such devices include perforating guns to perform perforating operations, flow control devices to control fluid flow (injection or production), packers to isolate different regions of the well, and other devices.

The activating mechanisms to activate such devices may include mechanical, hydraulic, and electrical activating mechanisms. To electrically activate a downhole device, a power source is connected to the downhole device. This is typically accomplished by using switches, either at the surface or in a downhole module. The switch is initially open to isolate the power source from the downhole device. When activation is desired, the switch is closed to provide electrical power to the downhole device.

In wellbore applications, one type of switch is made from a gas discharge tube, also known as a spark gap switch, that is either a triggered-type or over-voltage type switch. A triggered-type switch employs an external stimulus to close the switch or to activate it. An over-voltage switch is activated whenever the voltage level across the switch exceeds a threshold value.

Some switches employ a gas tube having an electrode at each end. In order to make the switch conduct electrical current, either a trigger voltage is applied to a third electrode, or the switch is forced into conduction as a result of an over-voltage condition. Since the typical gas tube discharge switch is arranged in a tubular geometry, it is usually associated with a relatively high inductance because of relatively long conduction path lengths. Also, the tubular shape of a gas tube does not allow convenient reduction of the overall size of a switch. Additionally, it may be difficult to package and integrate the gas tube switch with other components.

Another type of switch includes an explosive shock switch. The shock switch is constructed using a flat flexible cable having a top conductor layer, a center insulator layer, and a bottom conductor layer. A small explosive may be detonated on the top layer causing the insulator layer to form a conductive ionization path between the two conductor layers. One variation of this is a "thumbtack" switch in which a sharp metal pin is used to punch through the insulator layer to electrically connect the top conductive layer to the bottom conductive layer. The thumbtack switch is similar to the explosive switch but it may not be reliable because, as it punches a hole, the "thumbtack" may simply bend the insulation layer along with it, so that the thumbtack may fail to make a connection between layers.

Switches can also be used in other applications and other fields, such as in military, medical, manufacturing, communications, computers, consumer electronics, construction, demolition, seismic, and mining applications to safeguard electronic components by quickly shunting dangerous voltage and current surges to ground, to activate electrical devices, or initiate explosive devices. Many such switches are associated with various shortcomings as described above.

SUMMARY OF INVENTION

In general, according to one embodiment, an apparatus includes a switch having microelectromechanical elements, the microelectromechanical elements including a sealed chamber containing a dielectric element, and conductors in the sealed chamber. The conductors are arranged such that application of greater than a predetermined voltage causes breakdown of the dielectric element to provide an electrically conductive path between the conductors.

In general, according to another embodiment, a switch includes at least two conductors and a nanotube electron emitter to form at least part of an electrically conductive path between the at least two conductors.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to microswitches used for wellbores, such micro-switches (or other types of microelectromechanical devices) can be used for other applications, such as seismic, mining, military, medical, manufacturing, communications, computers, consumer electronics, construction, and demolition applications, and so forth.

As used here, the terms "up" and "down" "upper" and "lower" "upwardly" and downwardly" "above" and "below"; and other like terms indicating relative positions above or below a given point or element are used in this description to more clearly describe some embodiments of the invention. However, when applied to equipment and methods for use in wells that are deviated or horizontal, or when such equipment are at a deviated or horizontal orientation, such terms may refer to a left to right, right to left, or other relationship as appropriate.

Figure 1:
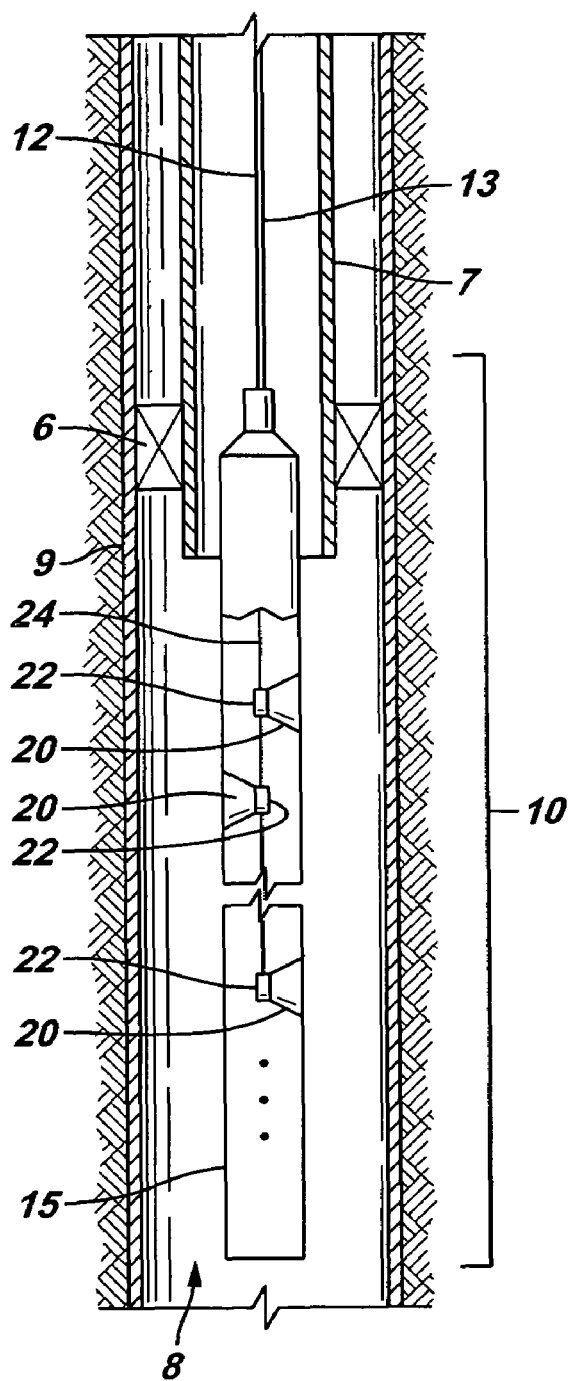
FIG. 1 illustrates an embodiment of a tool string for use in a wellbore.

Referring to FIG. 1, a downhole tool 10, which may include a perforating gun 15 as one example, is lowered through a tubing 7 positioned in a wellbore 8 that is lined with a casing 9. A packer 6 is set between the tubing 7 and the casing 9 to isolate the tubing-casing annulus. The downhole tool 10 is run on a carrier 12, which may be a wireline, slickline, tubing, or other carrier. Certain types of carriers 12 (such as wirelines) may include one or more electrical conductors 13 over which power and signals may be communicated to the downhole tool 10. The perforating gun 15 shown in FIG. 1 includes a plurality of shaped charges 20. In one embodiment, such shaped charges 20 may be detonated by use of initiator devices 22 that are activated by a command, issued from the well surface, which may be in the form of electrical signals sent over the one or more electrical conductors 13 in the carrier 12. Alternatively, the command may be in the form of pressure pulse commands or hydraulic commands. The initiator devices 22 may be electrically activated by signals communicated over one or more electrical lines 24.

Other implementations of the downhole tool 10 may include packers, valves, plugs, cutters, or other devices. Thus, in these other implementations, the command issued from the well surface may activate control modules to set packers, to open and close valves, or to actuate or release other devices. To activate a device in the downhole tool 10, switches may be provided to connect an electrical signal or electrical power to the device. For example, to initiate an explosive, the initiator device 22 may include a switch and an exploding foil initiator (EFI) circuit.

In accordance with some embodiments, switches may include microelectromechanical elements, which may be based on microelectromechanical system (MEMS) technology. MEMS elements include mechanical elements, which are moveable by an input energy (electrical energy or other type of energy). MEMS elements are microscopicscale elements formed with micro-fabrication techniques, which may include micromachining on a semiconductor substrate (e.g., silicon substrate). In the micromachining process, various etching and patterning steps may be used to form the desired micromechanical parts. Some advantages of MEMS elements are that they occupy a small space, require relatively low power, are relatively rugged, and may be relatively inexpensive.

Switches according to other embodiments may be made with microelectronic techniques similar to those used to fabricate integrated circuit devices. As used here, switches formed with MEMS or other microelectronics technology are generally referred to as "micro-switches." Elements in such micro-switches may be referred to as "micro-elements," which are generally elements formed of MEMS or microelectronics technology. Generally, switches or devices implemented with MEMS technology are referred to as "microelectromechanical switches." [0016] In one embodiment, micro-switches may be integrated with other components, such as EFI circuits to initiate explosives. Integrated components are contained in smaller packages, which enable more efficient space utilization in a wellbore. As used here, components are referred to as being "integrated" if they are formed on a common support structure placed in packaging of relatively small size, or otherwise assembled in close proximity to one another. Thus, for example, a micro-switch may be fabricated on the same support structure as the EFI circuit to provide a more efficient switch because of lower effective series resistance (ESR) and lower effective series inductance (ESL). The micro-switch may also be formed on a common substrate with other components to achieve more efficient packaging.

Figure 2A:
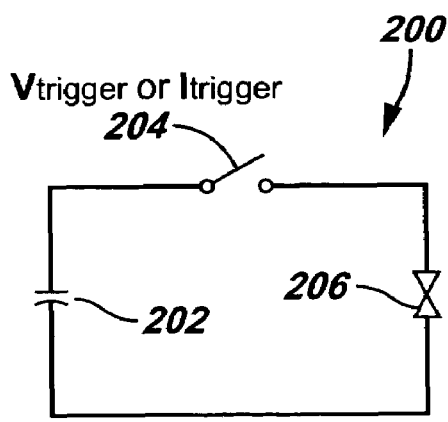
FIG. 2A is a schematic diagram of an exploding foil initiator (EFI) trigger circuit in accordance with an embodiment useable in the tool string of FIG. 1.

Referring to FIG. 2A, according to one embodiment, a capacitor discharge unit (CDU) includes an energy storage capacitor 202 that is chargeable to a trigger voltage level. The capacitor 202 provides a local energy source to provide activating energy. The capacitor 202 is connected to a micro-switch 204 that may be activated on to a closed, or conducting, state by a trigger voltage $V_{trigger}$ or trigger current $I_{trigger}$. When the switch 204 is closed, activating energy is coupled to an EFI circuit 206 to activate the EFI 206.

An EFI circuit typically includes a metallic foil connected to a source of electric current, such as the energy storage capacitor 202. A reduced neck section having a very small width is formed in the foil, with an insulator layer placed over a portion of the foil including the neck section. When a suitably high current is applied through the neck section of the foil, the neck section explodes or vaporizes. This causes a small portion of material, called a flyer, to shear away from the insulator layer. The flyer then travels through a barrel to impact an explosive to initiate a detonation.

Figure 2B:
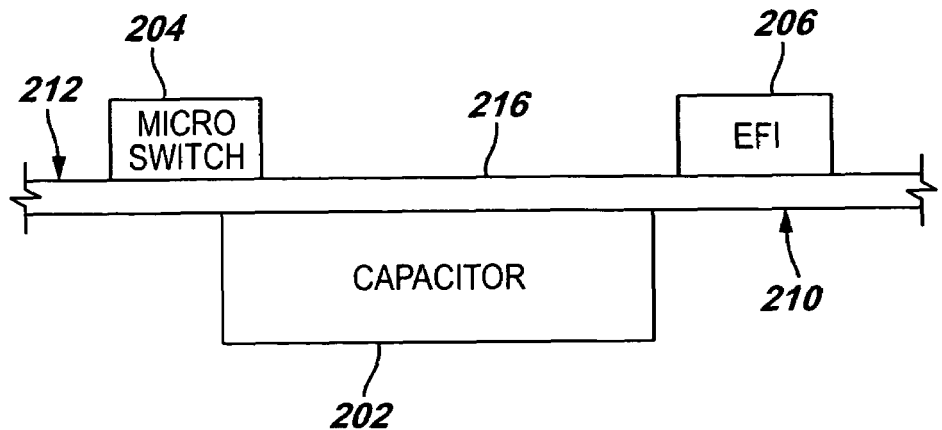
FIG. 2B illustrates a side view of the EFI trigger circuit of FIG. 2A.

A side view of the circuit depicted in FIG. 2A is shown in FIG. 2B. The capacitor 202 is mounted on a first surface 210 of a substrate 216, while the micro-switch 204 and EFI 206 are mounted on an opposite surface 212 of the substrate 216. Alternatively, the capacitor 202 can be mounted on the same surface as the micro-switch 204 or EFI 206. The capacitor 202, the micro-switch 204, and the EFI 206 are electrically connected together by electrically conductive paths, or traces, which are routed in the substrate 216.

In other embodiments, instead of the EFI 206, other types of electrically activated initiators can be used, such as exploding bridgewire (EBW) initiators, semiconductor bridge (SCB) initiators, and so forth. Also, alternatively, instead of the capacitor 202, other types of local energy sources can be employed. The micro-switches discussed herein can also be used in other downhole applications, such as in control devices, sensor devices, analog and digital circuits, and data networks. Alternatively, the micro-switches can be used in seismic, mining, or other applications.

The following describes various embodiments of micro-switches. Such micro-switches are useable in the CDU of FIG. 2A, or alternatively, they may be used to connect electrical energy to other types of components, whether used in a downhole environment or in another application (e.g., seismic or mining).

Figure 3:
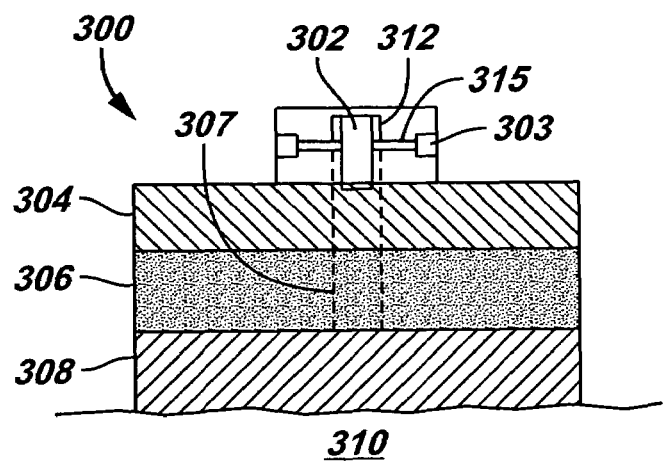
FIG. 3 illustrates an embodiment of a micro-switch including a microelectromechanical tack.

Referring to FIG. 3, according to an embodiment, a MEMS switch 300 is activable by a MEMS tack 302. In this embodiment, the MEMS tack 302 replaces the thumbtack actuator used in some conventional thumbtack switches. The switch 300 includes top and bottom conductor layers 304 and 308 that sandwich an insulating layer 306. The conductors 304 and 308 may each be formed of a metal or some other suitable conductive material. The insulator layer 306 may include a polymer material such as a polyimide film, as an example. The MEMS tack 302 may be placed over the top conductor layer 304. When actuated, such as by an applied trigger voltage $V_{trigger}$ having a predetermined amplitude, an actuator 303 releases the MEMS tack 302 to move through the layers 304 and 306 to contact the bottom conductor layer 308. This electrically couples the top and bottom conductors 304 and 308 to activate the switch 300. Thus, the electrically conductive layer 304 may be driven to a drive voltage $V_{drive}$, while the electrically conductive layer 308 is connected to the component to be activated (e.g., the EFI circuit 206 of FIG. 2).

In one embodiment, a preformed bore 307 may already be present in the layers 304 and 306 through which the MEMS tack 302 may travel. In another embodiment, the MEMS tack 302 may have a sharp tip to puncture through the layers 304 and 306 to reach the layer 308.

In one arrangement, the actuator 303 includes moveable support elements 315 that support the tack 302 at an enlarged flange portion 312. The support elements 315 when withdrawn from the tack flange portion 312 allow the tack 302 to drop into the bore 307. The support elements 315 may be radially moveable by a MEMS gear mechanism 303. When an electrical energy is applied, the MEMS gear mechanism 303 radially retracts the support elements 315 from the tack 302 to enable it to drop into the bore 307 to electrically connect the conductors 304 and 308. In an alternative arrangement, instead of retracting the support from the tack 302, a MEMS gear mechanism 303 may be employed to drive the tack 302 into the bore 307.

The layered structure making up the micro-switch 300 may be formed on a substrate 310, which may be a semiconductor, insulator, or other substrate. In one example, the substrate 310 may be a silicon substrate. The conductor layer 308 is first deposited on the substrate 310, followed by the insulator layer 306 and the next conductor layer 304. The bore 307 may be patterned by an anisotropic etch through the layers 304 and 306. The MEMS structure including the tack 302 and the actuator 303 may then be formed on top of the conductor layer 304 over the bore 307.

Figure 4A:
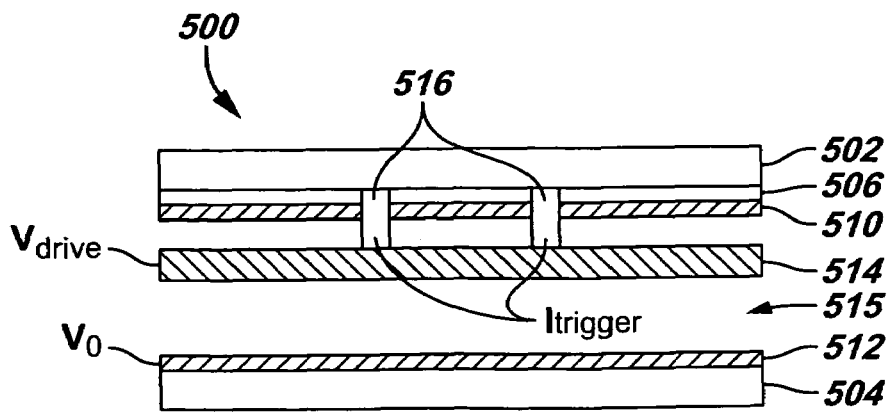
FIGS. 4A-4B illustrates another embodiment of a micro-switch having an electrode tethered by a frangible element.
Figure 4B:
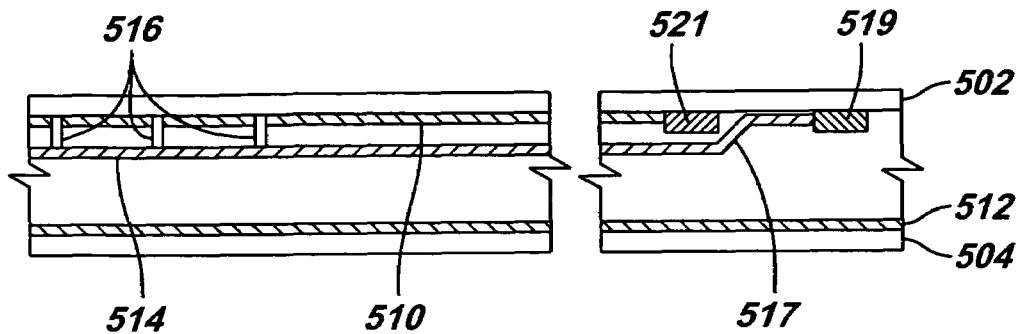

Referring to FIGS. 4A-4B, according to another embodiment, a micro-switch 500 includes a first substrate 502 and a second substrate 504. The first substrate 502 and the layers formed over it are actually shown upside down in FIGS. 4A-4B. In forming the micro-switch 500, the two substrates 502 and 504 are independently patterned, with one flipped upside down to face the other one.

An insulator layer 506 (e.g., a nitrite or $S_xN_y$ layer) is formed over a surface of the substrate 502. A conductive line 510 (e.g., a metal layer fabricated using a metal such as aluminum, nickel, gold, copper, tungsten, or titanium) is formed on the insulator layer 506. A plurality of tethers 516, each made of a semiconductor material such as doped silicon of selected resistivity, may then be formed on the substrate 502 for supporting a conductive plate 514, which may be made of a metal such as aluminum, nickel, gold, copper, tungsten, or titanium. The tethers 516 are bonded to the conductive plate 514 at the contact points between the tethers 516 and plate 514. The tethers 516, when exposed to a relatively large electrical current, disintegrate or otherwise break to allow the conductive plate 514 to drop through the gap 515 to contact a conductive layer 512 formed over the substrate 504. Thus, effectively, the tethers 516 are frangible elements that break apart in response to application of an electrical voltage or current.

As shown in FIG. 4B, the tethered plate 514 has a bent portion 517 that allows it to be electrically connected to a bond pad 519 formed over the substrate 502. The bond pad 519 may be contacted to a lead finger, for example, that provides a drive voltage $V_{drive}$ to the tethered conductive plate 514. The tethers 516 are contacted to the conductive line 510, which in turn may be connected to another bond pad 521 that receives a trigger current $I_{trigger}$.

In operation, the conductive plate 514 is driven to a drive voltage $V_{drive}$. When the micro-switch 500 is to be closed (or activated), a trigger current $I_{trigger}$ is applied through the conductive line 510, which breaks or disintegrates at least a portion of the tethers 516. This allows the conductive plate 514 (which is at the drive voltage $V_{drive}$) to drop to contact the conductive layer 512, thereby driving the voltage $V_o$ to the drive voltage $V_{drive}$. The conductive layer 512 (and the voltage $V_o$) may be connected to a device to be activated, such as the EFI circuit 206 of FIG. 2.

Figure 5:
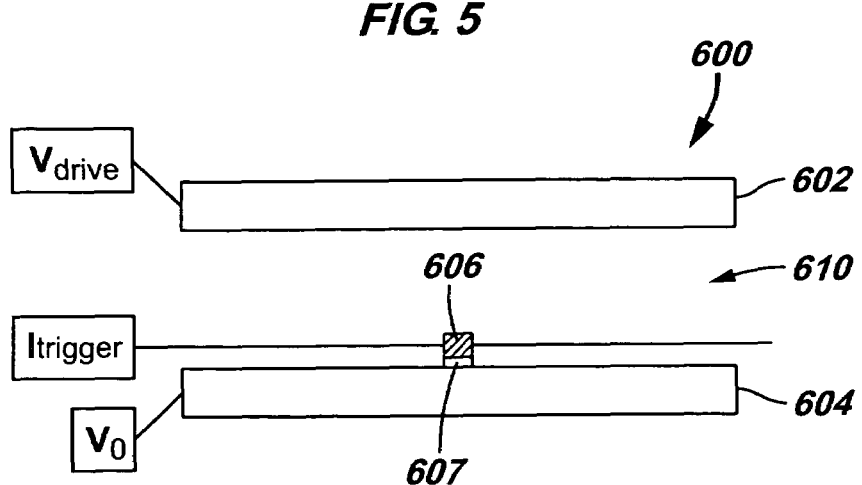
FIG. 5 illustrates yet another embodiment of a micro-switch having parallel plates and a dielectric layer capable of breaking down in response to an applied electrical current.

Referring to FIG. 5, yet another embodiment of a micro-switch 600 includes two parallel plates 602 and 604 with a dielectric layer 610 between the parallel plates. A dielectric layer is an electrically insulating layer. The dielectric properties of the dielectric layer 610 can be modulated by an electrical energy in the form of a trigger voltage or current to provide a conductive path between the two conductive plates 602 and 604. A conductive line 606 may be formed over the conductive plate 604, with an insulator layer 607 between the line 606 and conductive plate 604. The dielectric layer 610 separating the conductive plates 602 and 604 may be a dielectric solid, liquid, or gas. The line 606 when supplied with a trigger current causes the dielectric layer 610 to break down and provide a conductive path between the conductive plates 602 and 604.

In operation, a drive voltage $V_{drive}$ is applied to the conductive plate 602 with the conductive plate 604 coupled to a device to be activated. When a trigger current $I_{trigger}$ is applied to the line 606, the dielectric layer 610 breaks down and the voltage $V_{drive}$ is conducted through the conductive path from the conductive plate 602 to the other conductive plate 604 which raises the voltage, $V_o$, to the drive voltage $V_{drive}$.

Figure 6:
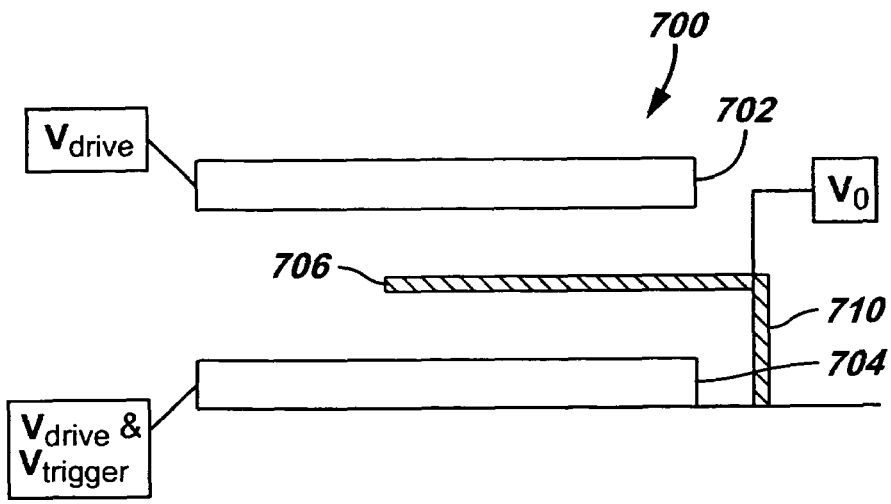
FIG. 6 illustrates a further embodiment of a micro-switch including a bistable element.

Referring to FIG. 6, a micro-switch 700 according to another embodiment includes a bistable microelectromechanical switch 700. The switch 700 includes a contact plate 706 that is maintained at a neutral position (i.e., inactive position) when a drive voltage $V_{drive}$ is applied. The contact plate 706 is positioned at substantially a midplane between plates 702 and 704. The plates 702 and 704 are each driven to $V_{drive}$ which maintains the contact plate 706 at its neutral position. When activation of the micro-switch 700 is desired, a trigger voltage $V_{trigger}$ is added to one of the plates 702 or 704 to increase the voltage to $V_{drive}+V_{drive}$. This creates an electrostatic force that causes an imbalance in the switch, which moves the plate 706 to contact the plate 704. The contact plate 706 at its base end is attached to a support column 710. In one embodiment, the contact plate 706 and support column are integrally formed with a metal to provide a cantilever. The cantilever is adapted to bend by application by an electrostatic force. When the cantilever plate 706 contacts the plate 704, the voltage $V_{drive}+V_{trigger}$ is communicated to the cantilever plate 706.

Figure 7A:
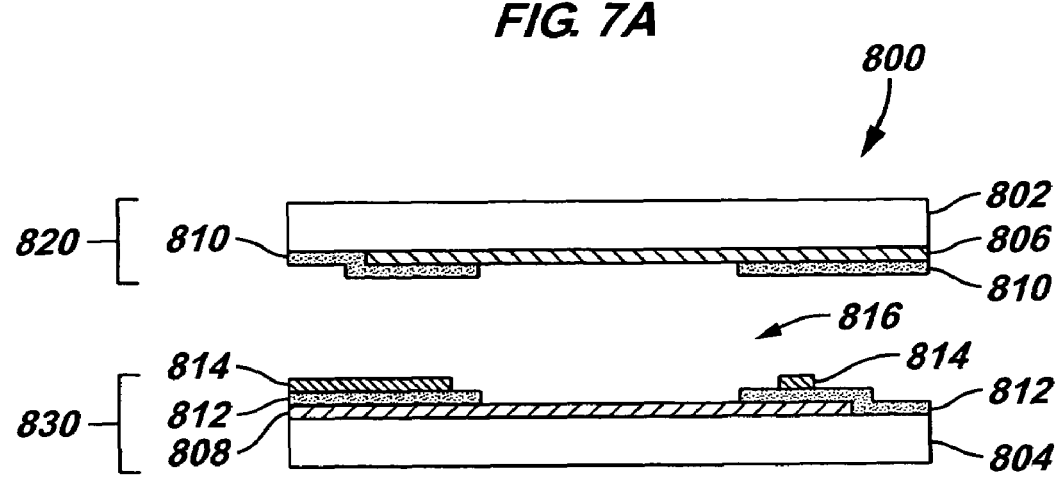
FIGS. 7A-7D illustrates yet a further embodiment of a micro-switch that includes a chamber containing a dielectric gas.
Figure 7B:
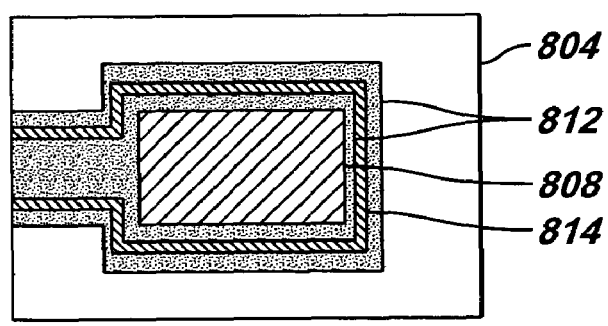
Figure 7C:
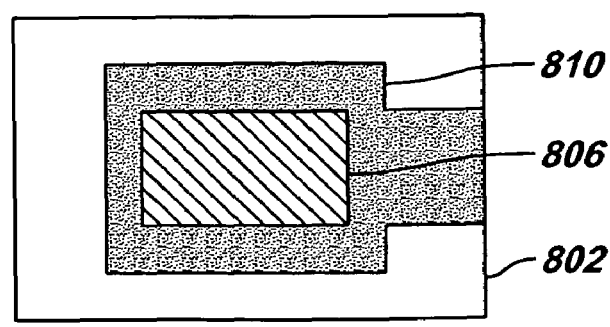

Referring to FIG. 7A-7D, another embodiment of a micro-switch 800 is illustrated. FIG. 7A is an exploded side view of the micro-switch 800, including an upper substrate 802 and a lower substrate 804. Structures may be formed on each of the substrates 802 and 804. FIG. 7B shows a top view of the lower substrate 804, and FIG. 7C shows a bottom view of the upper substrate 802. A conductive plate 806 and an upper dielectric layer 810 are deposited on the upper substrate 802. A lower conductive plate 808 is formed over the lower substrate 804, and a lower dielectric layer 812 is formed over the lower conductive plate 808. In addition, a triggering electrode 814 is formed over the dielectric layer 812.

As shown in FIG. 7C, the dielectric layer 810 has a portion cut away to form a window exposing the upper conductive plate 806. Similarly, as shown in FIG. 7B, the dielectric layer 812 has a portion cut away to form a window exposing the lower conductive plate 808.

Figure 7D:
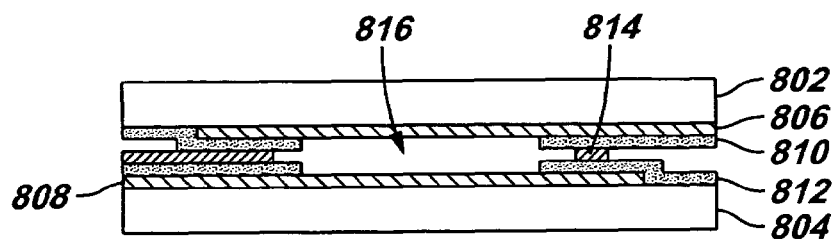

As shown in FIG. 7A, the upper substrate 802 is flipped to an upside down position. When the upper and lower substrates 802 and 804 and attached structures are electrically contacted to each other, the structure of FIG. 7D is achieved. The fabrication of the structure may be performed in a chamber filled with inert gas (e.g., Argon) so that the gap 816 formed as a result of bringing the two substrates 802 and 804 together is also filled with the inert gas. The gap 816 can also be filled with another gas, such as Nitrogen, Helium, Neon, Xenon, oxygen, air, or other gases. The gap 816 can also be filled with a mixture of different gases. Alternatively, the gap 816 may be filled with another dielectric element, such as a liquid or solid dielectric. The dielectric material is selected to break down upon application of a predetermined voltage or current trigger signal.

In operation, a trigger voltage is applied to the trigger conductor plate 814 that breaks down the insulator in the gap 816 to provide a conductive path between the upper conductive plate 806 and the lower conductive path 808, thereby closing the micro-switch 800.

Figure 8:
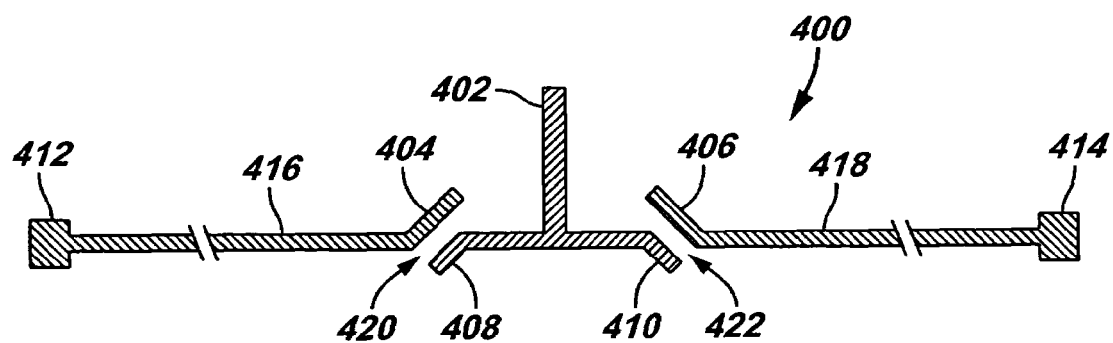
FIG. 8 illustrates another embodiment of a micro-switch including a moveable electrode.

Referring to FIG. 8, according to another embodiment, a MEMS switch 400 may include electrical contacts 404, 406, 408, and 410 separated by gaps 420 and 422. Contacts 404 and 406 are electrically coupled to lines 416 and 418, respectively, which terminate at electrodes 412 and 414, respectively. The electrodes 412 and 414 may be electrically contacted to corresponding components, such as to an energy source and a device to be activated by the energy source. The contacts 404 and 406 are slanted to abut against contacts 408 and 410, respectively, when the contacts 408 and 410 are moved upwardly by an actuator member 402. The actuator member 402 may be moved by application of a trigger voltage, for example. When the contacts 404, 406, 408, and 410 are contacted to one another, an electrically conductive path is established between the electrodes 412 and 414. Movement of the actuator member 402 may be accomplished by using MEMS gears (not shown).

The contacts 404, 406, 408, and 410 may be formed of metal or some other electrically conductive material. The switch 400 may be formed in a semiconductor substrate, such as silicon.

Figure 9:
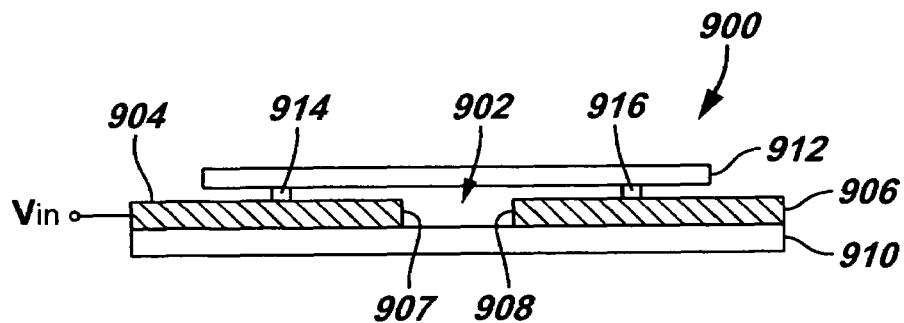
FIG. 9 is a cross-sectional view of a micro-switch according to another embodiment that includes a spark gap and laterally spaced apart conductors that define a portion of the spark gap.

FIG. 9 shows a micro-switch 900 according to yet another embodiment. The micro-switch 900, similar to the micro-switch depicted in FIGS. 7A-7D, includes a gap 902 (referred to as a spark gap) that contains an electrically insulating or dielectric material (i.e., a gas, liquid, or a solid). Effectively, the gap 902 in the micro-switch includes a sealed chamber, according to one embodiment. In other embodiments, the gap 902 is not sealed, but rather can be exposed to other portions of a tool or package in which the micro-switch 900 is located.

If the spark gap 902 is filled with gas, the gas may include nitrogen, argon, helium, xenon, oxygen, neon, air, or some mixture of gases. Unlike the arrangement depicted in FIGS. 7A-7D (in which conductive plates 806 and 808 are vertically arranged, in opposition on either side of the spark gap 816, as shown in FIG. 7D), the micro-switch 900 of FIG. 9 uses laterally arranged conductors 904 and 906. Each conductor 904 and 906 is an electrically conductive plate formed on an electrically insulating support structure (substrate 910). A portion of the spark gap 902 is provided between sides 907 and 908 of respective conductors 904 and 906. The substrate 910 on which the conductors 904 and 906 are formed may be made of an electrically insulating or dielectric material such as ceramic, silicon, glass, and so forth.

A cover 912 is provided over at least a portion of the conductors 904 and 906 and the substrate 910. Sealing elements 914 and 916 are provided between the lower surface of the cover 912 and upper surfaces of the conductors 904 and 906. The sealing elements 914 and 916 are provided for embodiments that employ a gas or liquid in the spark gap 902. The sealing elements 914 and 916 can be omitted for embodiments that employ a solid dielectric in the spark gap 902.

In addition to the region between sides 907 and 908 of conductors 904 and 906, the spark gap 902 also includes a region between the sealing elements 914 and 916 and between the underside of the cover 912 and the upper surface of the conductors 904 and 906.

The conductor 904 is connected to an input voltage source, while the conductor 906 is connected to a component to be activated when the micro-switch 900 closes. In the context of the FIG. 2A example, the input voltage source to the micro-switch 900 is provided by the capacitor 202, while the output (conductor 206) of the micro-switch 900 is connected to the EFI 206. In general, the micro-switch 900 connects an input electrical energy source to a component to be activated by the input electrical energy, where the micro-switch 900 is configured to close (conduct through the spark gap 902) in response to the input electrical energy exceeding a predetermined threshold (e.g., greater than a predetermined voltage).

To activate the micro-switch 900, a sufficiently high input voltage is applied to the conductor 904. The applied voltage of greater than a predetermined voltage threshold level causes the gas in the spark gap 902 to ionize (breakdown), which causes a transfer of electrical energy through the micro-switch from one conductor, 904, to the other, 906. In some embodiments, the predetermined voltage level at which breakdown occurs is about 700 volts. Therefore, application of an input voltage greater than or equal to 700 volts causes breakdown of the gas. The relatively high breakdown voltage is suitable for well applications, and also for seismic and mining applications. The breakdown voltage is a function of the type and pressure of gas employed, the distance between conductors across the spark gap, and other factors, presented below.

The breakdown of the dielectric gas in the spark gap 902 occurs according to a stochastic process. The stochastic process can vary according to (1) surface roughness or imperfections of the conductors 904 and 906 where charge builds up, (2) non-localized charge accumulation, and (3) surface changes, or erosion damage as the micro-switch is tested prior to use. These uncertainties produce variability of the exact location of the end points of the ionic discharge, which affects the arc-path length through the spark gap 902. This in turn causes uncertainty in the precise value of the discharge voltage. Also, contaminants such as moisture, chemical impurities or pollutants, within or on the surface of the conductor and other materials can also give rise to variable discharge voltage. In addition, there is variability in the dielectric gas caused by the impurities or contaminants within the gas itself as well as random motion and temperature of molecules of the gas.

Variability of the dielectric gas can be stabilized in a number of ways, such as by including radioactive material in or around the spark gap 902. Presence of radioactive material excites molecules in a more determined and predictable motion (i.e., ionizing radiation or excitation by beta particle emission). A small amount of radioactive gas, such as tritium, can be mixed into the gas in the spark gap 902, as one example. Alternatively, solid radioactive materials can be spotted inside or outside of the spark gap 902. Examples, of radioactive materials include isotopes of Chromium, Thorium, Potassium, Uranium, Nickel, or minerals which contain rich proportions of such materials; for example, Thorite (Th(SiO$_4$)), Uranite or certain rock salts (KCl). Appropriately small amounts of Thorium or Potassium (or naturally occurring minerals or rock salts containing rich proportions of such materials) have the added benefit of limiting radioactivity within acceptable bounds that may qualify as being exempt from special transportation and handling requirements in environmental regulations.

Figure 10:
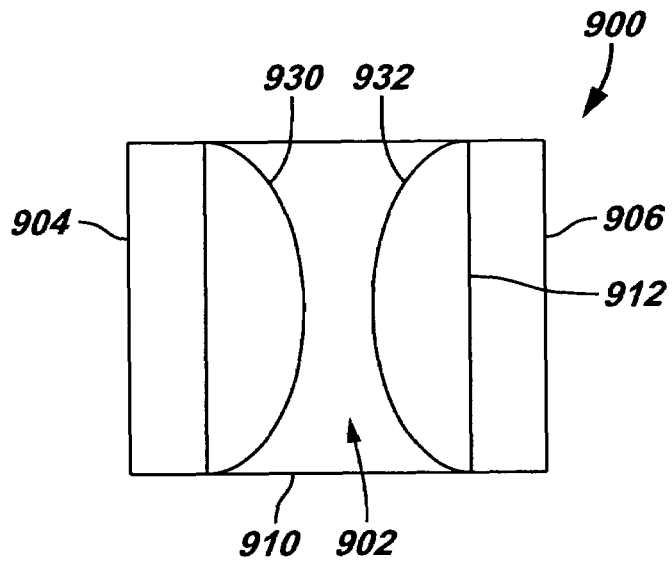
FIG. 10 is a top view of the micro-switch of FIG. 9.

FIG. 10 is a top view of the micro-switch 900. In this view, it is assumed that the cover 912 is transparent so that the structure underneath the cover 912 can be seen. Each of the conductors 904 and 906 has a curved side 930 and 932, respectively. This curved geometry (of the sides 930 and 932) of the conductors 904 and 906 localizes discharge points on the conductors 904 and 906 to improve predictability in the arc path across the spark gap 902. As depicted in FIG. 10, the curved sides 930 and 932 of the conductors 904 and 906 face each other across a portion of the spark gap 902. Instead of, or in addition to, using radioactive materials, the curved sides 930 and 932 of the conductors 904 and 906 can be used to reduce variability of discharge points on the conductors 904 and 906.

Figure 11:
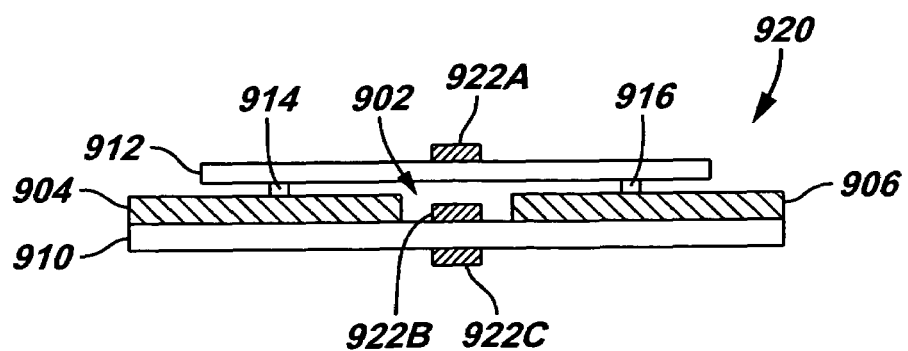
FIG. 11 is another embodiment of the micro-switch that is similar to the micro-switch of FIG. 9 except a trigger electrode is added to the micro-switch of FIG. 11.

FIG. 11 shows another embodiment of a micro-switch 920, which is substantially similar in arrangement as the micro-switch 900 depicted in FIG. 9 (components of the micro-switch 920 that are the same as components of the micro-switch 900 bear the same reference numbers). The difference in the micro-switch 920 is the presence of a trigger electrode, shown in alternate locations as 922A, 922B, or 922C. Only one of the trigger electrodes 922A, 922B, and 922C need be present for effective operation. Alternatively, more than one of the trigger electrodes 922A, 922B, and 922C can be present. The trigger electrode 922B is located within the spark gap 902, and is formed on the surface of the substrate 910 between sides 907 and 908 of respective conductors 904 and 906. The trigger electrode 922A is placed on an upper surface of the cover 912 (outside the spark gap 902). The trigger electrode 922C is placed on a lower surface of the substrate 910, also outside the spark gap 902.

In operation, a voltage is applied to the conductor 904. The voltage applied to conductor 904 is below the breakdown voltage that would cause ionization of the gas in the spark gap 902. To activate the micro-switch 920, a voltage pulse is applied to the trigger electrode 922 (one or more of electrodes 922A, 922B, and 922C). This voltage pulse causes the breakdown of the gas contained in the spark gap 902, thereby allowing electrical current to flow between conductors 904 and 906. In alternative embodiments, instead of a gas in the spark gap 902, a dielectric liquid or solid can be used instead.

Figure 12:
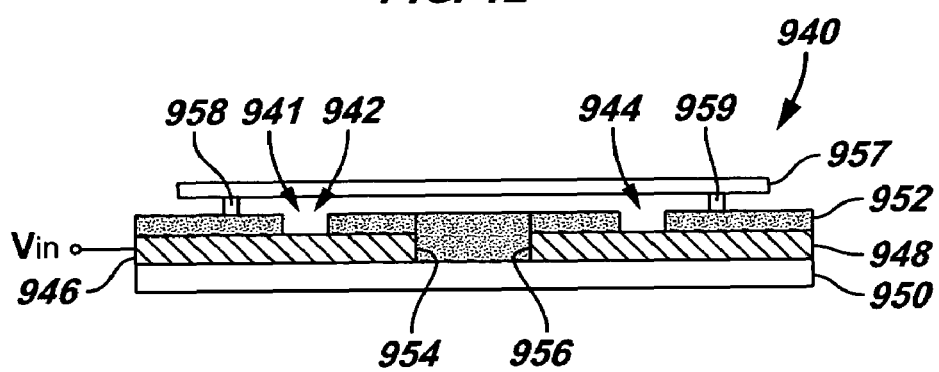
FIG. 12 is a cross-sectional view of a micro-switch according to a further embodiment that provides a dielectric layer with limited openings to define the spark gap.

Another stabilizing technique to reduce variability in the location of discharge points on conductors across a spark gap is to provide limited openings, such as limited openings 942 and 944 in a micro-switch 940 depicted in FIG. 12. The micro-switch 940 includes conductors 946 and 948, which are electrically conductive plates formed on a substrate 950. In addition, a solid dielectric layer 952 (with openings 942 and 944 formed in the dielectric layer 952) is disposed over the conductors 946 and 948. A middle portion of the dielectric layer 952 extends downwardly to fill a region between the sides 954 and 956 of the conductors 946 and 948, respectively. A cover 958 is disposed over the arrangement of the dielectric layer 952 and conductors 946 and 948. Sealing elements 958 and 959 are provided between the cover 957 and the dielectric layer 952 to provide sealing for a dielectric gas or dielectric liquid in a spark gap 941 defined by the cover 957, sealing elements 958 and 959, and conductors 946 and 948.

The spark gap 941 of the micro-switch 940 is filled in part by the solid dielectric layer 952. The openings 942 and 944 provided in the dielectric layer 952 enhance predictability in discharge points on the conductors 946 and 948.

In operation, if a sufficient voltage is applied to conductor 946, ionization of the gas occurs such that a discharge path extends from the conductor 946 through the opening 942. The discharge path travels through the space (which contains a dielectric gas or liquid) of the spark gap 941 above the dielectric layer 952 but below the cover 957 and through the other opening 944 to the other conductor 948.

Figure 13:
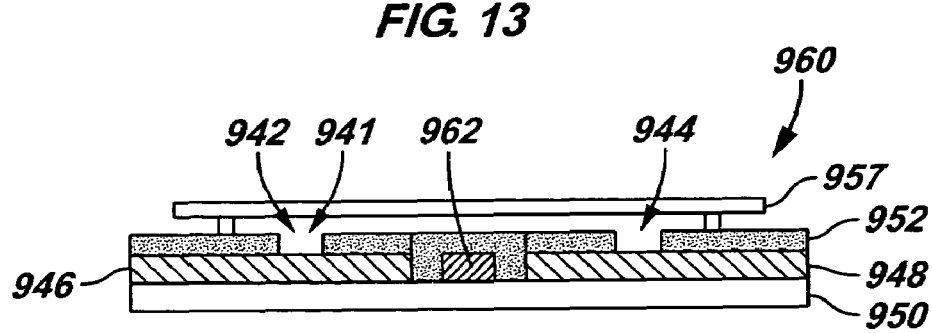
FIG. 13 is a cross-sectional view of another micro-switch that is similar to the micro-switch of FIG. 12 except the micro-switch of FIG. 13 includes provision of a trigger electrode.

FIG. 13 shows another micro-switch 960, which is identical to the micro-switch 940 of FIG. 12 except that a trigger electrode 962 is provided in a space defined in a portion of the dielectric layer 952. To operate the micro-switch 960, a voltage is applied to the conductor 948, with the voltage maintained at a level less than the breakdown voltage of the dielectric gas or liquid in the spark gap 941. A voltage pulse is applied to the trigger electrode 962 to cause breakdown of the dielectric gas or liquid in the spark gap 941.

Figure 14:
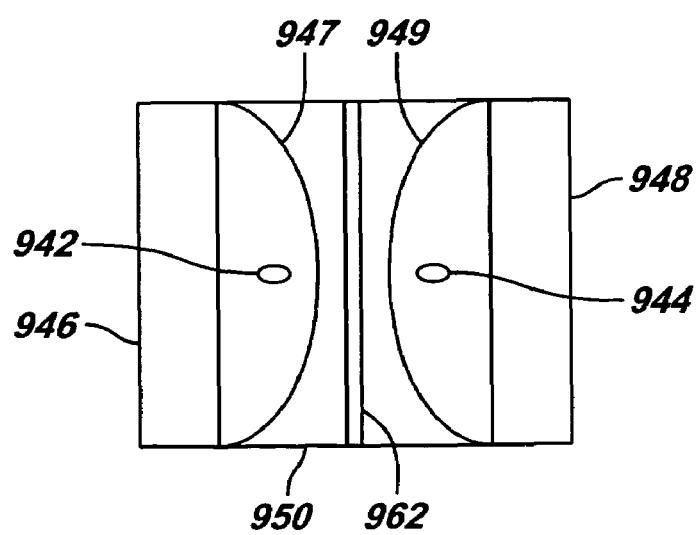
FIG. 14 is a top view of the micro-switch of FIG. 13.

FIG. 14 is a top view of the micro-switch 960 depicted in FIG. 13. As shown in FIG. 14, the cover 957, and the dielectric layer 952, are assumed to be transparent, for the purpose of this description, so that structures underneath such layers can be seen. The top view shows positions of the openings 942 and 944, as well as the position of the trigger electrode 962 that extends between conductors 946 and 948. The conductors 946 and 958 have curved sides 947 and 949 that face each other across a portion of the spark gap 941.

Figure 15:
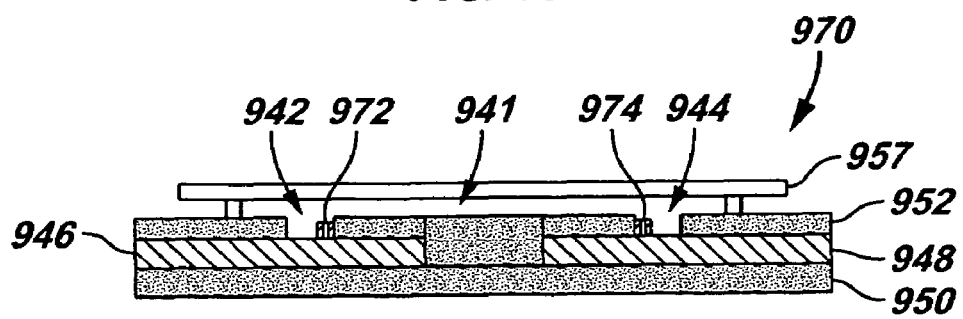
FIG. 15 is a cross-sectional view of a micro-switch according to yet a different embodiment that employs nanotube electron emitters.

According to another embodiment, as depicted in FIG. 15, a micro-switch 970 uses nanotube electron emitters 972 and 974. Alternatively, instead of nanotube electron emitters, radioactive isotope electron emitters can be used. The micro-switch 970 is similar in structure to the micro-switch 940 of FIG. 12 except for the addition of the nanotube electron emitters 972 and 974 in the micro-switch 970. The nanotube electron emitters 972 and 974 are formed on a surface of respective conductors 946 and 948 in respective openings 942 and 944. The nanotube electron emitters 972 and 974 help to stabilize the location and enhance the predictability of the discharge path through the spark gap 941. In effect, the nanotube electron emitters function as micro-miniature lightening rods. The ends of nanotubes concentrate and intensify the local electric field gradient thereby stimulating the ionization of nearby molecules of gas. Electrons are emitted very easily from the ends of the nanotube electron emitters. The nanotube electron emitters 972 and 974 are also electrically conductive, and are formed on the conductors 946 and 948 such that the nanotube electron emitters 972 and 974 electrically contact the conductors 946 and 948, respectively.

Carbon nanotubes (CNT) are seamless tubes of graphite sheets. A nanotube structure is basically a very small tube that has a wall thickness on the atomic scale. For example, a CNT is a tube in which the walls are formed of carbon molecules, where the wall thickness can be one molecule deep. CNTs were first discovered as multi-layer concentric tubes (i.e., multi-walled carbon nanotubes, MWCNT). Subsequently, single-walled carbon nanotubes (SWCNT) were prepared in the presence of transition metal catalysts. Embodiments of the invention may use SWCNT, MWCNT, or a mixture of the two. CNT have shown promising potentials in applications including, for example, nano-scale electronic devices, high strength materials, electron field emission, tips for scanning probe microscopy, and gas storage.

Main approaches to the synthesis of CNT include: laser ablation of carbon, electric arc discharge of graphite rod, and chemical vapor deposition (CVD) of hydrocarbons. Among these approaches, CVD coupled with photolithography has been found to be the most versatile in the preparation of various CNT devices. In a CVD method, a transition metal catalyst is deposited on a silicon wafer in the desired pattern, which may be fashioned using photolithography followed by etching. The silicon wafer having the catalyst deposits is then placed in a furnace in the presence of a vapor-phase mixture of, for example, xylene and ferrocene. Carbon nanotubes typically grow on the catalyst deposits in a direction normal to the substrate surface. Various carbon nanotube materials and devices are now available from commercial sources, including Molecular Nanosystems (Palo Alto, Calif.) and Bucky, USA (Houston, Tex.).

Other CVD methods include methods for preparing carbon nanotubes on silica (SiO2) and silicon surfaces without using a transition metal catalyst. According to such methods, areas of silica (SiO2) are patterned on a silicon wafer, by photolithography and etching. Carbon nanotubes are then grown on the silica (SiO2) areas in a CVD or a plasma-enhanced CVD (PECVD) process. These methods permit the production of carbon nanotube bundles in various shapes. Carbon nanotubes suitable for embodiments of the invention may be prepared according to this method.

As noted above, carbon nanotubes have unique physical and electrical properties. As electron field emitters, carbon nanotubes have the characteristics of low work function, durability, and thermal stability. Accordingly, an electron field emitter based on CNT can be driven at relatively low voltages. In addition, the chemical resistance of such devices to reactions with gases, which may be generated during the operation of the device, is improved, thereby increasing the life span of the emitters.

With the nanotube electron emitters 972 and 974, reliable firing of the spark gap 941 is provided by making use of the efficient and stable electron emission properties of the nanotube electron emitters. In one embodiment, the nanotube electron emitters are carbon nanotube electron emitters. Alternatively, boron nanotube electron emitters can be used. Electrons can be emitted very easily from the ends of the nanotube electron emitters.

Figure 16:
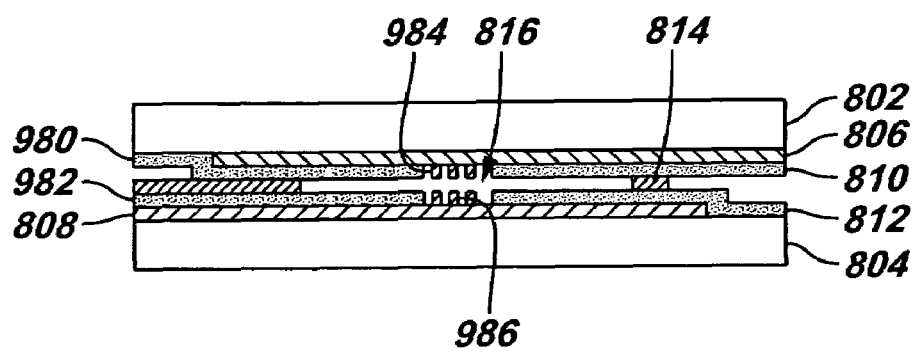
FIG. 16 is a cross-sectional view of a micro-switch according to yet another embodiment.

FIG. 16 illustrates yet another micro-switch, which is identical to the micro-switch of FIG. 7D except for the provision of a dielectric layer 980 (on a surface of conductive plate 806) and a dielectric layer 982 (on a surface of conductive plate 808). Each dielectric layer 980 and 982 includes an opening in which are provided respective nanotube electron emitters 984 and 986. The nanotube electron emitters 984 and 986 provide for a more predictable arc-path across the spark gap 816.

Figure 17:
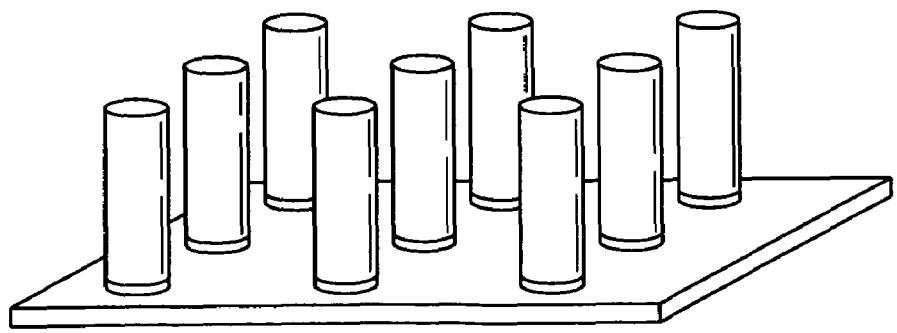
FIG. 17 illustrates nanotube electron emitters formed on a support structure.

FIG. 17 shows an arrangement of multiple nanotube electron emitters that can be provided on each of the conductors 946 and 948 (FIG. 15). The nanotube electron emitters can be uniformly and precisely positioned on each of the conductors 946 and 948. The high degree of uniformity at the nanometer scale results in very tight tolerance in the electron potential design, or breakdown threshold voltage, of the nanotube electron emitters when compared to the micrometer-scale surface defects present on metal or other electrically conductive electrodes.

Nanotube electron emitters oriented such that their longest dimensions are aligned with an electric field provides superior performance. Nanotube electron emitters can also be used in the micro-switches 900, 920, and 960 depicted in FIGS. 9, 11, and 13, respectively.

Benefits of the various micro-switches disclosed may include the following. Generally, the micro-switches may be implemented in relatively small assemblies, which improves the efficiency of the switches due to reduced resistance and inductance. Further, some of the microswitches may be integrated with other components, such as energy storage capacitors, and other devices, such as EFI circuits, to form an overall package that is reduced in size. Reliability and safety of the switches are enhanced since explosives or mechanical actuation as used in some conventional switches are avoided.

While the invention has been disclosed with respect to a limited number of embodiments, those skilled in the art will appreciate numerous modifications and variations therefrom. It is intended that the appended claims cover all such modifications and variations as fall within the true spirit and scope of the invention. For example, other switch configurations using micro-elements may be used.

The invention claimed is:

1. An apparatus comprising:
   a switch comprising microelectromechanical elements, the microelectromechanical elements comprising:
   a sealed chamber containing a dielectric element; and
   conductors in the sealed chamber,
   wherein the conductors are arranged such that application of greater than a predetermined voltage causes ionization breakdown of the dielectric element to provide an electrically conductive path between the conductors.

2. The apparatus of claim 1, wherein the dielectric element in the sealed chamber comprises at least one of argon, neon, helium, xenon, nitrogen, oxygen, and air.

3. The apparatus of claim 2, wherein the dielectric element in the sealed chamber comprises a mixture of at least any two of argon, neon, helium, xenon, nitrogen, oxygen, and air.

4. The apparatus of claim 1, further comprising a substrate and a cover, wherein the conductors are arranged on the substrate,
   wherein the cover, substrate, and conductors define the sealed chamber.

5. The apparatus of claim 4, wherein the microelectromechanical elements further comprise sealing elements provided between a surface of the cover and surfaces of the conductors to provide the sealed chamber.

6. The apparatus of claim 4, wherein the dielectric element comprises at least one of a dielectric gas and a dielectric liquid.

7. The apparatus of claim 6, wherein the microelectromechanical elements further comprise a dielectric layer formed over the conductors in the sealed chamber, the dielectric layer having plural openings adjacent respective conductors to provide discharge paths from the conductors through the at least one of the dielectric gas and dielectric liquid contained in the sealed chamber.

8. The apparatus of claim 1, wherein the microelectromechanical elements further comprise nanotube electron emitters placed on the conductors in the sealed chamber.

9. The apparatus of claim 8, wherein the nanotube electron emitters comprise carbon nanotube electron emitters.

10. The apparatus of claim 8, wherein the nanotube electron emitters comprise boron nanotube electron emitters.

11. The apparatus of claim 1, wherein the conductors each has a curved side, the curved sides of the conductors facing each other across a portion of the sealed chamber.

12. The apparatus of claim 1, wherein the microelectromechanical elements further comprise a trigger electrode to receive a pulsed signal to cause breakdown of the dielectric element in the sealed chamber.

13. The apparatus of claim 12, wherein the trigger electrode is within the sealed chamber.

14. The apparatus of claim 12, wherein the trigger electrode is outside the sealed chamber but in the proximity of the sealed chamber.

15. The apparatus of claim 1, further comprising:
an initiator electrically connected to the switch.

16. The apparatus of claim 15, further comprising a local energy source to provide the predetermined voltage to the switch.

17. The apparatus of claim 15, wherein the initiator comprises at least one of an exploding foil initiator, an exploding bridgewire initiator, and a semiconductor bridge initiator.

18. The apparatus of claim 1, further comprising a substrate, the conductors formed on a surface of the substrate, wherein at least a portion of the sealed chamber is between sides of the conductors.

19. The apparatus of claim 1, wherein the dielectric element comprises at least one of a dielectric gas and dielectric liquid.

20. The apparatus of claim 19, further comprising a housing in which the switch is located, the housing providing the sealing for the sealed chamber.

21. The apparatus of claim 1, further comprising a radioactive material in the proximity of the switch to enhance predictability in the ionization breakdown of the dielectric element.

22. The apparatus of claim 21, wherein the radioactive material is provided in the sealed chamber.

23. The apparatus of claim 21, wherein the radioactive material comprises at least one of Chromium, Thorium, Potassium, Uranium, Nickel, and a mineral containing a proportion of Chromium, Thorium, Potassium, Uranium, and Nickel.

24. The apparatus of claim 21, wherein the radioactive material comprises at least one of Thorite, Uranite, and a rock salt.

25. A switch comprising:
electrical conductors; and
a dielectric material between the conductors,
wherein each of the conductors has a curved side, the curved sides of the conductors facing each other across the dielectric material, wherein the electrical conductors and dielectric material are microelectromechanical elements.

26. The switch of claim 25, further comprising a sealed chamber containing the dielectric material, the dielectric material comprising a gas.

27. A switch comprising:
conductors;
a dielectric material between the conductors; and
nanotube electron emitters electrically connected to at least one of the conductors,
wherein the dielectric material is adapted to break down in response to applied electrical energy provided to at least one of the conductors to provide an electrically conductive path between the conductors.

28. The switch of claim 27, wherein the dielectric material comprises a gas.

29. The switch of claim 28, further comprising a sealed chamber containing the gas.

30. The switch of claim 29, further comprising a dielectric layer disposed over the conductors in the sealed chamber, the dielectric layer having openings to expose respective conductors.

31. The switch of claim 30, wherein the nanotube electron emitters are disposed in at least one of the openings of the dielectric layer and in electrical contact with at least one of the conductors.

32. A method of activating a component, comprising:
providing a switch having microelectromechanical elements, the microelectromechanical elements comprising a sealed chamber containing at least one of a dielectric gas and dielectric liquid, and conductors in the sealed chamber;
applying an input voltage to at least one of the conductors to cause breakdown of the at least one of the dielectric gas and dielectric liquid such that an electrically conductive path extends between the conductors; and
electrically connecting the input voltage to the component through the switch.

33. The method of claim 32, wherein electrically connecting the input voltage to the component comprises electrically connecting the input voltage to a well device.

34. The method of claim 32, wherein electrically connecting the input voltage to the component comprises electrically connecting the input voltage to an explosive device.

35. The method of claim 32, wherein electrically connecting the input voltage to the component comprises electrically connecting the input voltage to at least one of an explosive foil initiator, an exploding bridgewire initiator, and a semiconductor bridge initiator.

36. A switch comprising:
at least two conductors;
a nanotube electron emitter to form at least part of an electrically conductive path between the at least two conductors; and
a dielectric element adapted to ionize in response to input energy to provide another part of the electrically conductive path.

37. The switch of claim 36, further comprising at least another nanotube electron emitter.

38. A method comprising:
activating a switch having conductors and at least one of a nanotube electron emitter and a radioactive isotop electron emitter;
conducting electrical current between the conductors through an electrically conducting path including the at least one of the nanotube electron emitter and radioactive isotope electron emitter; and
coupling an explosive device to the switch.

39. The method claim 38, further comprising running a tool including the switch into a well,
wherein activating the switch comprises activating the switch while the tool is in the well.

* * * * *